United States Patent [19]

Heermans

[11] 4,418,637
[45] Dec. 6, 1983

[54] AUDIBLE SIGNAL VALVE KNOB

[75] Inventor: Thomas W. Heermans, West Bend, Wis.

[73] Assignee: Regal Ware, Inc., Kewaskum, Wis.

[21] Appl. No.: 256,208

[22] Filed: Apr. 21, 1981

[51] Int. Cl.³ .................... G01L 19/12; A47J 27/52
[52] U.S. Cl. .................................. 116/70; 99/344; 126/388
[58] Field of Search .................. 116/70, 140; 126/388; 99/344, 285

[56] References Cited

U.S. PATENT DOCUMENTS

| 906,594 | 12/1908 | White et al. | 116/140 |
| 1,811,853 | 6/1931 | Landman | 116/140 |
| 1,943,834 | 1/1934 | Meneghette | 126/388 X |
| 4,134,358 | 1/1979 | Heermans | 116/70 |
| 4,215,646 | 8/1980 | Williams | 116/70 |

FOREIGN PATENT DOCUMENTS

| 2737878 | 2/1978 | Fed. Rep. of Germany | 126/388 |
| 25961 | of 1908 | United Kingdom | 99/285 |

Primary Examiner—Daniel M. Yasich
Attorney, Agent, or Firm—Wheeler, House, Fuller & Hohenfeldt

[57] ABSTRACT

A knob for a cooking vessel is a whistle which gives an audible signal that cooking temperature has been reached, and has a valve slide assembly including a separate leaf spring for shutting off the whistle. Supporting inside and outside knob parts incorporate halves of a resonance chamber, which makes the knob extremely simple to mold, assemble, clean, and disassemble. The valve slide rests in guides which make it impossible to assemble incorrectly, and is overlaid by a knob cover. The leaf spring biases the valve slide against the top wall of the resonance chamber so that when the slide valve is closed the passage from the resonance chamber to the ambient air is effectively blocked.

15 Claims, 3 Drawing Figures

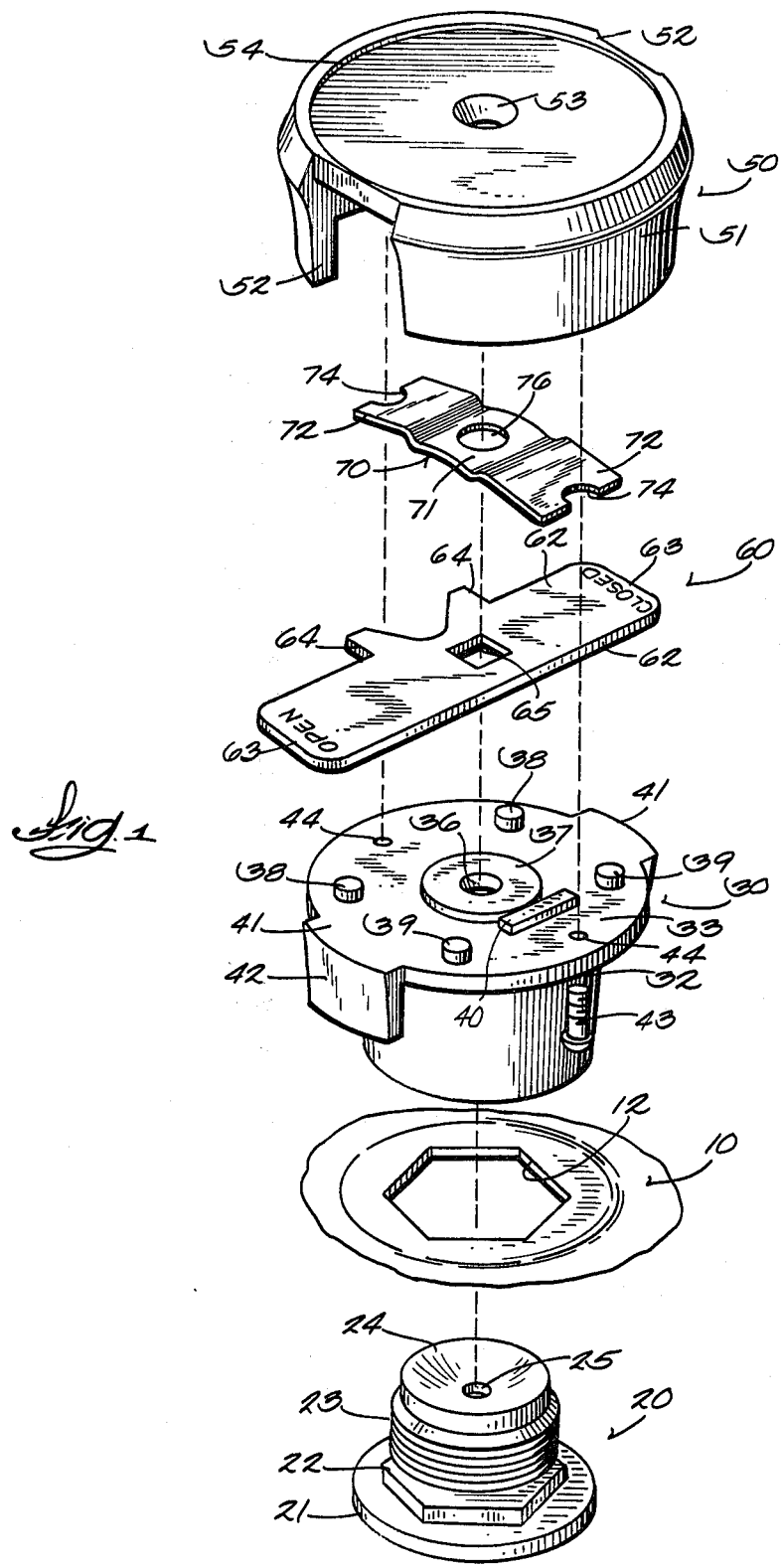

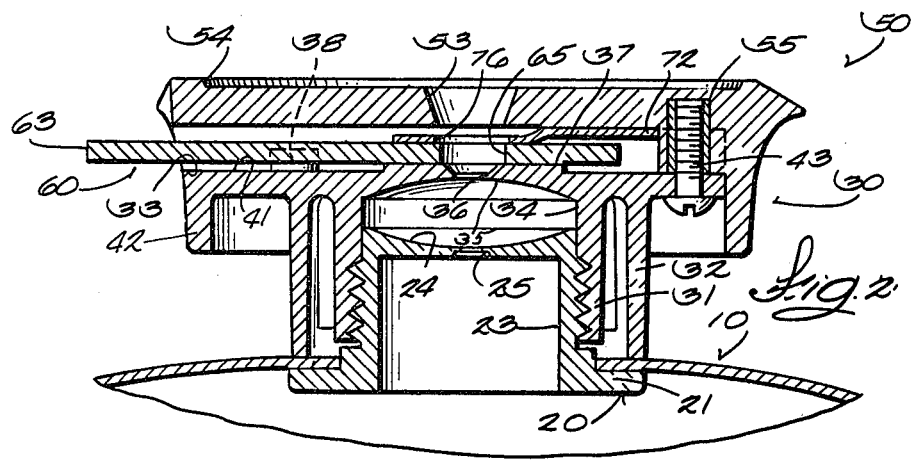
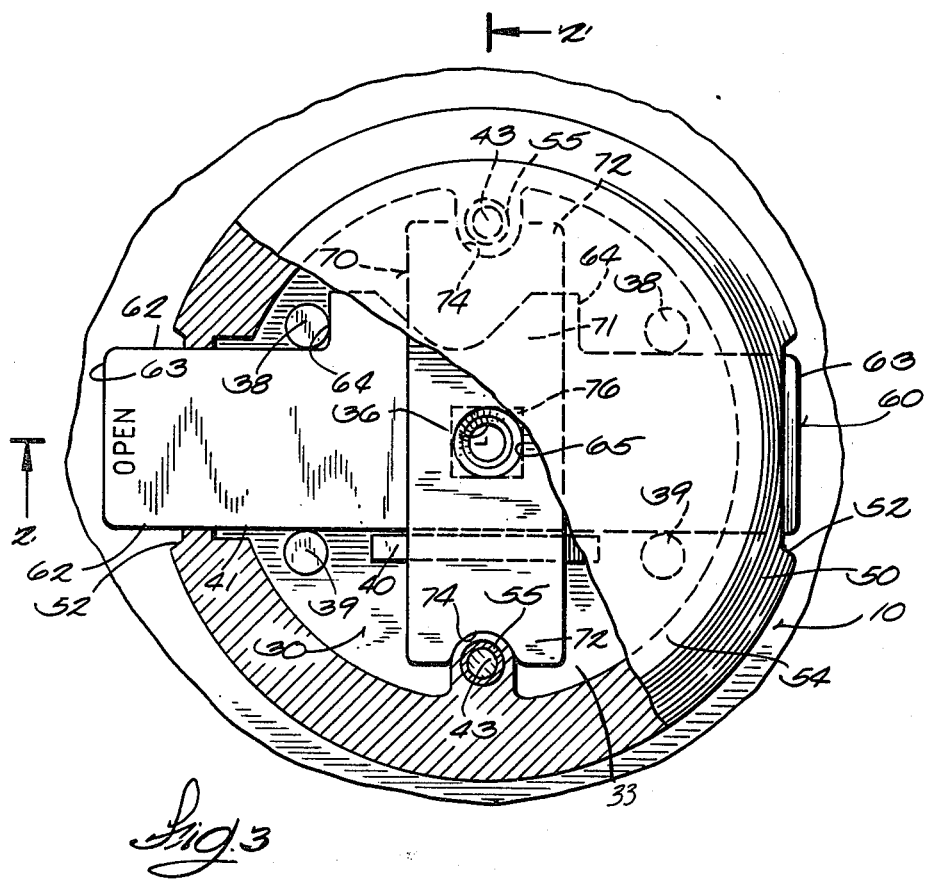

AUDIBLE SIGNAL VALVE KNOB

BACKGROUND OF THE INVENTION

"Waterless" cooking is old, as are knobs which give an audible signal when steam is formed to indicate attainment of cooking temperatures. Tops for cooking vessels which are provided with whistles and having means to turn the whistle off or to allow the escape of steam are also known. However, mechanically these are quite different from my device. Many such knobs cannot be disassembled. Those few which can be disassembled for cleaning could also release the knob portion accidentally under steam pressure, which might well cause loss of the knob or even injury.

Slide valves are of course known in other connections but a slide valve possesses unique advantages in a whistle knob. Likewise, the method of assembly is believed to possess unique advantages.

SUMMARY OF THE INVENTION

A knob for the top or lid of a cooking vessel is provided with a whistle, a resonance chamber, and a slide valve assembly, including a separate leaf spring. The knob has five major parts: a base portion which preferably has a non-circular part which projects through a complementary opening in the lid and which carries a whistle orifice and a portion of a resonance chamber; an upper body portion which screws on to the base portion outside the vessel lid and which carries lid engaging parts, asymmetric slide valve guides and stops, and the upper portion of the resonance chamber; the slide valve member itself, which is so shaped as to incorporate asymmetric abutments for the guides and stops on the upper body; a valve knob cover portion preferably non-rotatably fastened to the upper body to enclose the valve slide and to provide a surface for a decorative design or wording and to provide a means to separate the knob at the resonance chamber; and a leaf spring which bears between the slide valve member and the valve cover portion to assist in seating the valve and to keep the valve member in place. Each of the parts but the cover contains an opening through which steam and sound may escape, the opening in the valve slide being movable from a position aligned with the other openings to a position displaced from the other openings. The cover diverts steam sideways and down. Because of the preferred screw assembly of the knob base to the remainder of the knob the parts may be readily detached by the user from the vessel top for cleaning and the portions needing to be cleaned are readily accessible. In particular the resonance chamber separates into two easily cleaned parts. The valve spring is also easily made and easily cleaned. If necessary, the removal of two screws allows complete disassembly of the knob for more thorough cleaning. The parts are so shaped that incorrect assembly is impossible and correct assembly is readily determined by inspecting the parts because the shapes of the parts dictate correct assembly. At the same time the slide is so made that when it is assembled it is capable only of limited movement so that it cannot be lost. The knob is sufficiently large so that it may readily be grasped without contact with steam emerging from the central opening. When the contents of a vessel have reached cooking temperature, as indicated by whistling, the slide valve is closed and the temperature reduced for "waterless" cooking at reduced temperatures and pressures. Not all of these features need to be present in my invention, but preferably they are. The slide valve keeps the user's fingers away from the steam, with help of the cover.

DRAWINGS

In the drawings,

FIG. 1 is an exploded perspective view of the parts of my audible signal valve knob.

FIG. 2 is a cross sectional view of my knob and of a vessel top in which it is installed taken along line 2—2 in FIG. 3.

FIG. 3 is a top view of my knob with parts broken away.

DESCRIPTION

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

As best shown in FIG. 1, the top of a cooking vessel 10 is provided with a non-circular opening 12 to which the various parts of the knob of my invention are mounted. These consist of an inner knob or knob base 20, an outer knob 30, a knob cover 50, a valve slide 60, and a leaf spring 70.

The knob base, or inner knob 20 consists of a lower flange 21, a hexagonal portion 22 to complementarily fit the opening 12 in the vessel 10, which could be any appropriate preferably non-circular shape, a threaded portion 23 and the lower resonance chamber portion 24 surrounding a whistle orifice 25 having a form suited to generate a tone when a vapor passes through it. Orifice 25 is better shown in FIG. 2.

Outer knob 30 consists of an inner skirt 31 adapted to screw on to threaded portion 23 of the lower knob, an outer skirt 32 which bears on the vessel 10 when outer knob portion 30 is screwed into place, a horizontal valve supporting surface 33, resonance chamber sidewall 34 and resonance chamber upper wall 35, the center of the resonance chamber upper wall 35 a second whistle orifice 36 directly above the first orifice 25 in the assembled position, an orifice-surrounding boss 37, slide stop abutments 38, slide guide abutments 39 and guide bar abutment 40. At diametrically opposite portions of valve supporting surface 33 the outer knob 30 is provided with slight projections 41, each provided with a depending tab 42 which underlies the slide valve path and becomes part of the knob cover, which aligns it for non-rotatable assembly by means of screws 43. The knob cover 50 is provided with a depending skirt 51 extending entirely around the knob and enclosing it with the exception of relieved portions 52 the size of depending tabs 42 of the upper knob so that when the knob cover is placed onto the upper knob body it is automatically aligned to receive screws 43 which secure the upper knob body to the knob cover through holes 44. Knob cover 50 has an orifice 53 in the center of the upper wall 54 and aligned with orifices 25 and 36. Knob cover 50 also has studs 55 depending from the under side of its upper wall 54 within the margin of skirt 51 to receive screws 43 and to assist in locating lift spring 70. Studs 55 are shown in FIG. 3. Relieved portions 52 in skirt 51, in addition to forming keys to receive tabs 42 for non-rotatable alignment also serve in their upper portions as part of the valve slide path. Ends of the valve slide means 60 project therefrom so that they may be manipulated, as will be described later.

Valve slide 60 rests on boss 37 and is movable along a valve slide means path extending from one surface extension 41 to the opposite projection 41 between slide stop abutments 38 and slide guide abutments 39 and guide bar abutment 40, along a chord of the knob, preferably a diameter.

Valve slide means 60 consists of an asymmetric valve member having a pair of long sides 62 and a pair of ends 63. One of the long sides 62 is provided with a pair of sidewardly extending abutments 64 which are spaced apart a distance along the slide valve path which is sufficiently less than the distance between slide stop abutments 38 in the same direction to permit whistle orifice 65 to be moved in the direction of the valve slide path to a first position over orifice 36 and to a second position completely unaligned with orifice 36. For that purpose it is preferable that orifice 65 not be in the exact center of rectangular body 61 but be spaced slightly from the center in the direction parallel to long sides 62 and to the valve slide path.

Leaf spring 70 is a generally rectangular member made of any suitably resilient and heat resistant material such as spring stainless steel. It has a depressed central portion 71, a raised wing 72 at each end, forked ends 74 in each wing to locate spring 70 between the studs 55 depending from knob cover 50, and a central orifice 76 positioned coaxially of orifices 25, 36 and 53 when the knob is assembled. The leaf spring biases valve slide means 60 away from upper wall 54 into engagement with boss 37 so the valve slide is always biased into good contact with the boss and provides an effective seal, whether the valve is opened or closed. The exact amount of bias can be varied by changing the dimensions or material of leaf spring 70; the bias should be sufficient to create a seal and maintain the selected position of slide 60, but not so great as to distort the valve slide or prevent the slide from being operated to open or close the valve.

Thus, in the present embodiment valve means are defined by valve supporting surface 33, whistle orifice 36, boss 37, valve slide means 60 and the parts 62–65 thereof, and leaf spring 70 bearing between upper wall 54 and valve slide means 60. These parts cooperate together to regulate the flow of a fluid such as air between whistle orifice 36 and the exterior of the knob according to the position of valve slide means 60 in the previously defined valve slide path.

When my knob is assembled as shown in FIGS. 2 and 3, one of the ends 63 of valve slide means 60 will project through one of the relieved portions in knob cover 50 and will preferably bear a legend indicating whether the valve is open or closed. It may be slid along the valve path by finger pressure on the exposed end 63 to push that end flush with knob skirt 51 and expose the other end 63, thereby opening or closing the valve. The valve construction described is simply made, readily cleaned and re-assembled, and keeps the fingers of the user away from escaping steam, unlike earlier structures.

As a whistle, the knob presents a series of orifices 25, 36, 65, 76, and 53 separated by a resonance chamber consisting of a lower resonance chamber portion 24 in the knob base 20, and resonance chamber side wall 34 and resonance chamber wall 35 in the outer knob 30, which form a very effective whistle. The remaining three orifices are not a part of the whistle, as such, but provide a valve and an escape path respectively. When food is being heated in vessel 10, a temperature is reached at which substantial quantities of water vapor are generated and rush through orifices 25 and 36 and the intervening resonance chamber, creating a whistling sound to warn the cook that the temperature should now be reduced for effective waterless cooking. The valve slide 60 is then moved from the open position shown in FIG. 2 to its closed position in which orifice 65 is displaced with respect to orifice 36, by pushing on the projecting end 63 of the valve slide which is at the left in FIG. 3 until the other abutment 64 strikes the corresponding slide stop abutment 38. The top of vessel 10 in which the knob is located is now completely sealed and will retain the vapor within the pan to seal in the flavors and moisture. Such cooking is well known.

However, the presence of the whistle orifices and resonance chamber in my knob offer the possibility of contamination by volatile food substances, or even, if the conditions are wrong, by solids passing through orifice 25. In any case, it is desirable to be able to attain complete cleanliness in the knob. As best shown in FIG. 1, by removing the entire outer knob 30, spring 70, slide 60, and knob cover 50, by unscrewing them from knob base 20, the knob may be removed from vessel 10. It will be noted that although pressure can be applied only to knob cover 50, the reliefs 52 serve to prevent relative rotation, as do screws 43, and apply the pressure to tabs 42 of the upper knob body, carrying it along as the cover 50 is rotated. Because opening 12 is preferably non-circular; and complementary (non-circular) hexagonal portion 22 of the lower knob body fits within it, it is easy to turn the upper portion while the lower portion remains stationary. The only remaining step to completely disassemble the knob, if that is necessary, is to remove the two screws 43. These have been exposed once the outer parts of the knob are removed, but are concealed by insulative plastic when the knob is assembled.

From a consideration of FIGS. 1 and 3 it will be seen that the valve slide 60 can only be placed on the outer knob 30 in a functional position with the words visible and abutments 64 disposed adjacent and between slide stop abutments 38 to limit the travel of valve slide means 60 as indicated previously. Stops 38 have a space between them to receive abutments 64 but because of guide bar abutment 40 there is no comparable space between slide guide abutments 39. When the slide 60 and spring 70 are in place on outer knob 30 cover 50 is placed over them, being guided by tabs 42 and reliefs 52 into position so that screws 43 are perfectly aligned for insertion. With screws 43 in place the entire outer part of the knob is unitary. The knob base 20 may then be inserted in vessel 10 through opening 12 and the outer knob parts screwed on to threads 23, whereupon skirt 32 bears on vessel 10 above flange 21 to give a very secure anchorage.

It will be seen from FIG. 1 that while the parts are disassembled all surfaces are readily accessible for cleaning, whether the disassembly is complete or whether the upper separable parts are merely unscrewed from the base part. In either case there is only one way to re-assemble the parts and that way is clear to the user.

I claim:

1. In a knob for a cooking vessel, a knob base projecting through the vessel and provided with a first whistle orifice and a surrounding lower resonance chamber portion; an outer knob abutting the vessel, removably secured to said knob base, and disposed outside the vessel, said outer knob comprising a resonance chamber upper wall having a second orifice therein, said lower resonance chamber portion and upper resonance resonance chamber wall defining a resonance chamber between them; a path area defined by abutments on the top of said outer knob, between which valve slide means slides, said path area crossing said second orifice; said valve slide means having abutments projecting from one side thereof, said projecting abutments limiting the travel of said valve slide means with respect to said abutments on the top of said outer knob; said valve slide means having first and second positions in said path area and being provided with a third orifice aligned with said second whistle orifice when said slide is in said first position and non-aligned therewith when said slide is in said second position; a knob cover removably secured to said outer knob and having a fourth orifice communicating with said third orifice; and a separate biasing means positioned between said valve slide means and knob cover to urge said valve slide means into good contact with a circular boss disposed on a valve supporting surface of said outer knob and surrounding said second whistle orifice.

2. The device of claim 1 in which the biasing means urging the valve slide means into good contact with the circular boss comprises a leaf spring extending upwardly from said valve slide means a distance greater than the depth of the path area to engage said knob cover and maintain said valve slide means in engagement with the boss.

3. The device of claim 2, wherein said leaf spring is a generally rectangular member having a depressed central portion for bearing against said valve slide means, raised wings at each end for bearing against said knob cover, and a central orifice communicating between said second and third orifices when said valve slide means is in said first position.

4. The device of claim 3, wherein said leaf spring has forked ends to locate it between first and second studs depending from said knob cover.

5. The device of claim 1 in which the the projecting abutment of said slide valve means is at only one side of the valve slide, and the said abutments include a ridge at only the other side of the valve path, so that the valve slide may only be assembled to the upper body in a correct orientation.

6. The device of claim 1 in which the length of said valve slide means is greater than the length of said path area by an amount approximately equal to the distance between said slide stop abutments minus the distance between said projecting abutments of said valve slide means, whereby when said valve slide means is actuated in one direction said valve slide means projects from one side of the knob, and when said valve slide means is actuated in the other direction said valve slide means projects from the other side of said knob to provide a visual indication of which end of said valve slide means to push to change the the condition of the valve.

7. The device of claim 1 in which the first whistle orifice is the primary producer of sound.

8. The device of claim 1 in which said outer knob is held to said knob base by a screw thread, said knob base having a non-circular portion to engage a non-circular vessel opening and a flange extending laterally therefrom through which said knob base extends, said outer knob having a vessel top engaging portion opposed to said flange to clamp the vessel top between said outer knob and said knob base when the screw thread is engaged, the knob cover being screwed to the outer knob by means of screws extending upwardly through a portion of said outer knob and into the knob cover whereby said screws are concealed, but are accessible when said outer knob and knob cover are unscrewed from said knob base.

9. The device of claim 1 wherein said path area is linear and said valve slide means is rectangular, said path area being located between a guide bar abutment disposed parallel to said valve slide means and at least two slide stop abutments, wherein said abutments are integral with a valve supporting surface of said outer knob and adjacent to a long side of said valve slide means, wherein said slide stop abutments are spaced apart a distance equal to the width of said projecting abutments of said valve slide means plus a distance at least equal to the larger of the length of said third orifice and the length of said second orifice.

10. The device of claim 1 in which said valve slide means is urged against said boss, said boss being of less height than said guide bar abutment and said slide stop abutments whereby contact between the bottom of said valve slide means and said valve supporting surface is limited to reduce friction and to improve sealing.

11. In a knob for a vessel in which substances containing water are to be heated, said knob comprising: a knob base having at least a part underlying the top of said vessel and a non-circular part extending through a complementary non-circular opening in said vessel; a separable part removably secured to said knob base and having a portion bearing on the outside of said vessel; passages in said knob communicating between the inside and outside of said vessel and shaped to cause an audible whistle when steam passes therethrough, said passages including a resonance chamber between said knob base and separable part whereby separation of the knob base and separable part permits cleaning of the resonance chamber; and valve means positioned in said passages to control the movement of steam; the improvement wherein said valve means comprises slidable valve slide means coacting with plural abutments and projection means to selectively open and shut said passages, a knob cover overlying said valve slide means, and a heat resistant leaf spring bearing and configured to fit between said knob cover and valve slide means to urge said valve slide means against the outer margin of an outer one of said passages.

12. In a knob for a vessel in which substances containing water are to be heated, said knob comprising: a base part; a separable part; passages in said knob communicating between the inside and outside of said vessel and shaped to cause an audible whistle when steam passes therethrough, said passages including a resonance chamber between said base part and said separable part whereby separation of the base part and separable part permits cleaning of the resonance chamber, at least one of said passages passing through a boss; and a slide valve positioned in said passages adjacent said boss to control the movement of steam, said valve comprising an asymmetric valve slide member having an orifice therein movable in a path in the plane of said member to at least two positions respecting the separable part of the knob, including a first position in which the orifice is aligned with said passages and a second position in which the orifice is not so aligned, and abutment means on said separable knob part disposed asymmetrically in the plane of said slide member and defining a path between said first and second positions for said valve member, said abutment means being so positioned with respect to the asymmetric valve member that the valve member fits in the valve path in only a functional manner, the improvement wherein said valve member is positioned between said resonance chamber and a knob cover bridging said passages, and a leaf spring is interposed between said knob cover and valve member to urge said valve member sealingly against said boss, thereby blocking said passages when said asymmetric valve slide member is in said second position.

13. In a knob for a vessel in which substances containing water are to be heated, said knob comprising: a base part; a separable part; passages in said knob communicating between inside and outside of said vessel and shaped to cause an audible whistle when steam passes therethrough, said passages including a resonance chamber between said base part and said separable part whereby separation of the base part and separable part permits cleaning of the resonance chamber; and a valve positioned in said passages to control the movement of steam; the improvement wherein said valve comprises an asymmetric valve member having an orifice therein movable to at least two positions respecting the separable part of the knob, including a first position in which the orifice is aligned with said passages and a second position in which the orifice is not so aligned, and asymmetric abutment means on said separable knob part defining a path between said first and second positions for said valve member, said abutment being so positioned with respect to the asymmetric valve member that the valve member fits in the valve path in only a functional manner, the separable knob portion including a knob cover having a orifice aligned with said passages, said knob cover extending over said valve path to secure said valve member therein, said knob cover being provided with an opening the path for said valve member to permit manual actuation of the valve member through the knob cover, the remainder of the separable portion of said knob having at least one projection extending through said opening beneath said valve member shaped to make said knob cover non-rotatable with respect to the remainder of the separable portion of said knob and to align the knob cover so that its orifice lies over said passages, said valve member being biased against the separable part of the knob by a leaf spring bearing between the knob cover and the valve member.

14. The device of claim 13 in which fastening means secure said knob cover to the remainder of the separable part of the knob body.

15. In a knob for a vessel in which substances containing water are to be heated, said knob comprising: a base part; a separable part; passages in said knob communicating between the inside and outside of said vessel and shaped to cause an audible whistle when steam passes therethrough, said passages including a resonance chamber between said base part and separable part whereby separation of the base part and separable part permits cleaning of the resonance chamber; and a valve positioned in said passages to control the movement of steam; the improvement wherein said valve comprises an asymmetric valve member having an orifice therein movable to at least two positions respecting the separable part of the knob, including a first position in which the orifice is aligned with said passages and a second position in which the orifice is not so aligned, and asymmetric abutment means on said separable knob part defining a path between said first and second positions for said valve member, said abutment being so positioned with respect to the asymmetric valve member that the valve member fits in the valve path in only one functional manner, the valve being generally rectangular with a central laterally extending projection lying between valve path defining abutments spaced apart a distance at least equal to the distance across the projection plus the distance across the whistle passages at the point where they are crossed by the valve member, said valve member being biased against said separable knob part by a leaf spring interposed between said asymmetric valve member and a knob cover overlying said passages, said knob being circular and said valve path being a chord of the separable portion of the knob.

* * * * *